(12) United States Patent
Kubotera et al.

(10) Patent No.: US 7,130,158 B2
(45) Date of Patent: Oct. 31, 2006

(54) HEAD ARM OF MAGNETIC DISK DEVICE

(75) Inventors: Hiroyuki Kubotera, Kawasaki (JP);
Naozumi Tsuda, Kawasaki (JP);
Tsugito Maruyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/157,028

(22) Filed: May 29, 2002

(65) Prior Publication Data
US 2002/0186512 A1    Dec. 12, 2002

(30) Foreign Application Priority Data
May 30, 2001    (JP)    ............... 2001-162678

(51) Int. Cl.
*G11B 5/55* (2006.01)
(52) U.S. Cl. ................................... 360/266
(58) Field of Classification Search ........... 360/266; 369/244; 720/662
See application file for complete search history.

(56) References Cited

U.S. PATENT DOCUMENTS

| 4,723,186 | A | * | 2/1988 | Nakajima et al. | 360/244.9 |
| 5,734,524 | A | * | 3/1998 | Ruiz | 360/234 |
| 5,999,372 | A | * | 12/1999 | Peterson et al. | 360/265.9 |
| 6,366,432 | B1 | * | 4/2002 | Tadepalli et al. | 360/266 |
| 6,473,271 | B1 | * | 10/2002 | Rahman et al. | 360/266 |
| 6,614,626 | B1 | * | 9/2003 | Raphael et al. | 360/266 |
| 6,751,068 | B1 | * | 6/2004 | Kant et al. | 360/266 |

* cited by examiner

*Primary Examiner*—Hoa T. Nguyen
*Assistant Examiner*—Mark Blouin
(74) *Attorney, Agent, or Firm*—Greer, Burns & Crain, Ltd.

(57) ABSTRACT

A head arm of a magnetic disk device has reduced air flow turbulence around the head arm using one or more of several configurations, such as multiple apertures, various chamfered edges, various protrusion configurations, and head arm shapes.

25 Claims, 12 Drawing Sheets

HEAD ARM OF MAGNETIC DISK DEVICE

BACKGROUND OF THE INVENTION

The present invention relates to a head arm of a magnetic disk device, and more particularly, to a head arm of a magnetic disk device having one or more features for reducing vibrations attributable to turbulence of the air flow generated with the rotation of the magnetic disk.

Currently, a commonly used hard disk device used for an internal or external storage unit or the like has a CSS (contact start stop) system in which the magnetic disk medium and the magnetic head are in contact with each other at the time of activation. In this type of hard disk device, the magnetic head mounted at the forward end of the head arm through a suspension floats due to the air flow generated with rotation of the magnetic disk.

FIG. 11 is a perspective view schematically showing a conventional magnetic disk device, in which a magnetic disk 43 is mounted on a spindle motor 42 fixed on a housing 41, and is adapted to be rotated at a predetermined rotational speed by the spindle motor 42. A magnetic head 46 for reading/writing the magnetic information recorded on the magnetic disk 43 is suspended on a suspension 45 mounted at the forward end of the head arm 44, and floats due to the air flow generated with the rotation of the magnetic disk 43.

The head arm 44 is rotatably mounted on a rotary shaft 47 and is adapted to swing in the direction along the diameter of the magnetic disk 43 by an actuator making up a head arm drive motor 49. In this case, the access rate to the data written in the magnetic disk 43 is determined by the rotational speed of the magnetic disk 43 and the moving speed of the head arm 44. For achieving a faster access, therefore, the rotational speed of the magnetic disk 43 and the moving speed of the head arm 44 can be increased.

With the conventional head arm 44, in order to improve the access rate, the forward end portion nearer to the suspension 45 is formed with a substantially rectangular weight-reducing aperture 48 about 6 mm wide and about 20 mm long, to reduce the moment of inertia of the head arm 44. The air flow caused by rotation of the magnetic disk 43, however, generates an air eddy in the weight-reducing aperture 48 formed in the head arm 44. This air eddy provides a source of vibration of the head arm 44, thereby leading to the problem of reduced positioning accuracy of the magnetic head 46. This situation will be explained with reference to FIG. 12.

FIG. 12(a) also shows a conventional head arm, and FIG. 12(b) shows the head arm interposed between two magnetic disks 50, 51. An air eddy 53 is generated in the weight-reducing aperture 48 formed in the head arm 44, and vibrates the head arm 44.

The conventional head arm 44 has a rectangular sectional shape. The phenomenon of flow separation occurs, therefore, downstream of the head arm 44, thereby generating an air eddy. With this air eddy as a vibration source of the head arm 44, the problem of reduced positional accuracy of the magnetic head 46 is posed. This situation will be explained with reference to FIG. 13.

FIG. 13(a) shows another conventional head arm, and FIG. 13(b) shows the head arm interposed between two magnetic disks 50, 51. Air eddies 54 are generated in the neighborhood of the downstream end portion of the head arm 44, and vibrates the head arm 44.

FIG. 13(c) shows the result of simulation of the air flow 52 in the neighborhood of the downstream end of the head arm 44 as viewed along the direction indicated by the arrow in FIG. 13(a). To simplify the illustration, the suspension and the magnetic head are not shown. It can be seen that the air flow 52 is disturbed and air eddies 54 are generated in the neighborhood of the downstream end of the head arm 44.

In the neighborhood of the central portion along the thickness of the portion near the head arm 44, the air flow 52 from the root or axis of the head arm 44 toward the forward end thereof is generated with rotation of the magnetic disk 43. The forward end portion of the conventional head arm 44 is arcuate. Therefore, the air flow 52 is separated and an air eddy 55 is generated at the forward end portion, as seen in FIG. 14. This air eddy 55 is a vibration source of the head arm 44, thereby leading to the problem that the positional accuracy of the magnetic head is reduced.

In the conventional magnetic disk device, both the rotational speed and the velocity of the air flow generated by rotation of the magnetic disk are low. Therefore, vibration has not posed a serious problem. For this reason, neither the shape of the weight-reducing aperture of the head arm nor the sectional shape of the head arm has been taken into consideration specifically in the design stage.

In recent years, however, in order to achieve a higher access rate, the rotational speed of the magnetic disk has been increased, which in turn has increased the velocity of the air flow generated by rotation of the magnetic disk. As a result, suppression of vibration of the head arm caused by pneumatic force, which has conventionally been ignored, has come to pose a serious problem.

Specifically, with the recent increase in recording density, an improved positioning accuracy of the magnetic head has posed a crucial problem. To obviate this problem, it is necessary not only to improve the head positioning control system but also to reduce the disturbance of the pneumatic force by the head arm and the adverse effect of the disturbance on the positioning accuracy of the magnetic head.

Accordingly, an object of the present invention is to reduce the turbulence of the air flow around the head arm.

SUMMARY OF THE INVENTION

In keeping with one aspect of the invention, a head arm of a magnetic disk device has a magnetic head mounted at the forward end portion thereof. The head arm is driven by an actuator at the other end. Arm apertures in the head arm are formed transversely of the head arm. By sizing the arm apertures appropriately such as by dividing the arm apertures into a plurality of sufficiently small apertures, the air eddy currents generated in the arm apertures can be suppressed, thereby making it possible to reduce the vibration of the head arm.

Also, according to another aspect of this invention, the downstream end portion of the head arm may be formed with an irregularity or chamfered portions at regular intervals. As another alternative, at least one of the two surfaces of the head arm in opposed relation to the magnetic disk may be formed with at least one protrusion, whereby the air eddy generated downstream of the head arm can be suppressed, thereby making it possible to reduce the vibration of the head arm.

In yet another aspect of the invention, the forward end portion of the head arm may be formed in the shape of a wedge, whereby the air eddy generated at the forward end portion of the head arm can be suppressed, thereby making it possible to reduce the vibration of the head arm.

The configuration of the arm apertures, the configuration of the downstream end portion, the configuration of the surfaces in opposed relation to the magnetic disk and the configuration of the forward end portion or any combination thereof may be employed at the same time. By doing so, generation of an air eddy can be suppressed in the arm apertures, at the downstream end portion or at the forward end portion of the head arm, thereby making it possible to reduce the vibration of the head arm further.

Further, in addition to the aforementioned configurations, a chamfered portion may be formed at the upstream end portion of the head arm, whereby the turbulence of the flow which otherwise might cause vibration can be suppressed by smoothing the air flow bombarding the head arm.

BRIEF DESCRIPTION OF THE DRAWINGS

The above mentioned and other features of this invention and the manner of obtaining them will become more apparent, and the invention itself will be best understood by reference to the following description of an embodiment of the invention taken in conjunction with the accompanying drawings, in which.

DETAILED DESCRIPTION

Now, a head arm according to a first embodiment of this invention will be explained with reference to FIG. 1.

Figure 1:
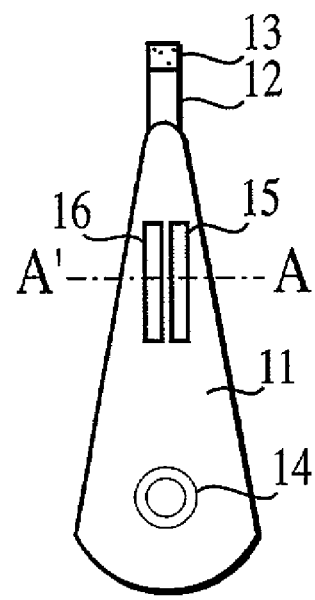
FIG. 1 is a plan view schematically showing a head arm according to the first embodiment of the invention.

FIG. 1 shows a head arm according to a first embodiment of the invention. A suspension 12 for supporting the magnetic head 13 is mounted at the forward end of the head arm 11 as in the prior art. A rotary shaft 14 is also arranged on the head arm 11. The head arm according to the first embodiment is formed with weight-reducing apertures 15, 16 having any suitable length, such as 13 mm, and any suitable width, such as 1.25 mm, for example, at an interval of 1.5 mm or the like.

Figure 2:
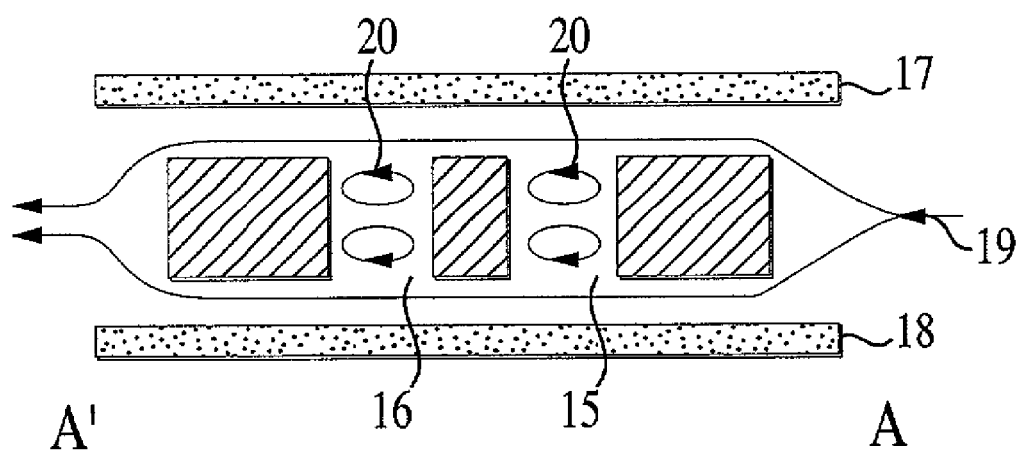
FIG. 2 is a diagrammatic sectional view taken along the one-dot chain line A–A' of FIG. 1.

FIG. 2 is a sectional view taken in one-dot chain A–A' in FIG. 1 and schematically shows the head arm interposed between two magnetic disks 17, 18. Since the weight-reducing apertures 15, 16 formed in the head arm 11 have so small a width, the air eddies 20 generated in the weight-reducing apertures 15, 16 are also reduced in size, with the result that turbulence of the air flow 19 is reduced in the same way as if the weight-reducing apertures 15, 16 were not formed.

Incidentally, the velocity distribution of the air flow 19 in the neighborhood of the head arm 11 formed with the weight-reducing apertures 15, 16 was measured by the laser Doppler flowmeter to determine the turbulence energy downstream of the head arm 11. As compared with the case where the conventional weight-reducing apertures are formed, it was confirmed that the turbulence energy is reduced by about 10%.

The dimensions of the weight-reducing apertures 15, 16 are not limited to the values described above, but can be appropriately changed in accordance with the shape and weight of the head arm. The number thereof is not limited to two, but may be three or more as required.

The weight-reducing apertures 15, 16 can be formed by punching according to the first embodiment, but the invention is not limited to this configuration. For example, a somewhat large weight-reducing aperture may be formed by punching, and then divided by bonding a plastic bridging material.

As described above, according to the first embodiment of the invention, the weight-reducing apertures 15, 16 formed for reducing the weight of the head arm 11 are so narrow that an air eddy is not substantially generated in the weight-reducing apertures 15, 16, and the air flow is not disturbed. Therefore, the vibration of the head arm 11 can be reduced.

Figure 3A:
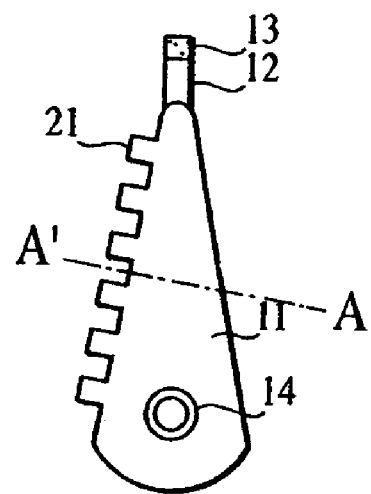
FIG. 3(a) is a plan view schematically showing a head arm according to a second embodiment of the invention.
Figure 3B:
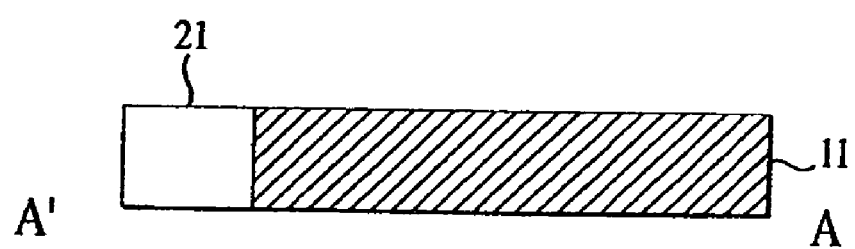
FIG. 3(b) is a diagrammatic sectional view taken along the one-dot chain line A–A' in FIG. 3(a).

Next, with reference to FIGS. 3(a) and (b), a head arm according to the second embodiment of the invention will be explained. In this embodiment, the suspension 12 for supporting the magnetic head 13 is mounted at the forward end of the head arm 11 as in the prior art. The head arm 11 also includes a rotational shaft 14.

A plurality of protrusions 21 having a width of perhaps 1 mm and a protrusion length of about 1 mm are formed at regular intervals on the downstream side of the head arm according to the second embodiment. In the diagram, six protrusions 21 are shown.

As the result of the provision of the protrusions 21, the large secondary air eddy currents which otherwise might be generated in the plane perpendicular to the head arm surface in the neighborhood of the protrusions 21 are reduced and destroyed around the protrusions by an air eddy having a rotational axis perpendicular to that of the secondary air eddy. Thus, the air flow turbulence can be reduced.

According to the second embodiment, therefore, the provision of the protrusions 21 on the downstream side of the head arm 11 can suppress the turbulence of the downstream flow, thereby reducing the force for vibrating the head arm.

Figure 4A:
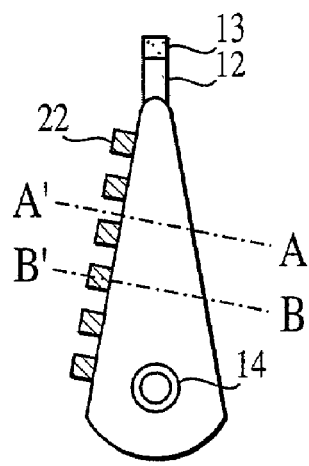
FIG. 4(a) is a plan view schematically showing a head arm according to a third embodiment of the invention.
Figure 4B:
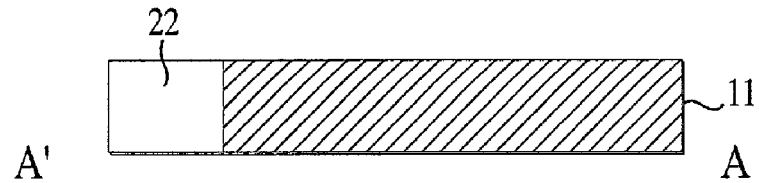
FIG. 4(b) is a diagrammatic sectional view taken along the one-dot chain line A–A' in FIG. 4(a)
Figure 4C:
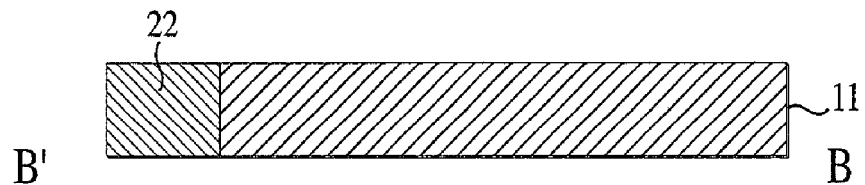
FIG. 4(c) is a diagrammatic sectional view taken along the line B—B in FIG. 4(a).

Next, a head arm according to a third embodiment of the invention will be explained with reference to FIGS. 4(a) to 4(c). In the third embodiment, protrusions of another form are provided in place of the protrusions formed by punching. As in the prior art, the suspension 12 for supporting the magnetic head 13 is mounted at the forward end of the head arm 11. The head arm 11 further includes a rotary shaft 14.

The head arm according to the third embodiment comprises six protrusions 22, as shown in the drawing, made of plastic 1 mm wide and protruding 1 mm long, for example, at regular intervals on the downstream side of the head arm 11.

The third embodiment is similar to the second embodiment in shape, but different from the second embodiment in material. As in the second embodiment, downstream turbulence can be suppressed by the protrusions 22 formed on the downstream side of the head arm 11, thereby making it possible to reduce the force for vibrating the head arm.

Figure 5A:
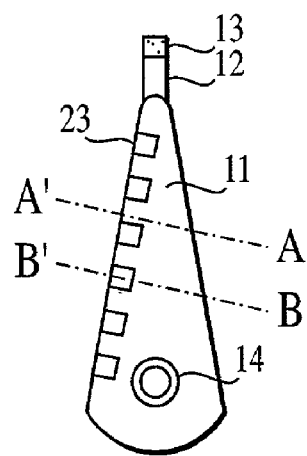
FIG. 5(a) is a plan view schematically showing a head arm according to a fourth embodiment of the invention.
Figure 5B:
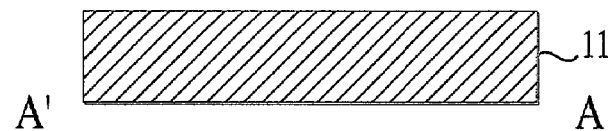
FIG. 5(b) a diagrammatic sectional view taken along the one-dot chain line A–A' in FIG. 5(a)
Figure 5C:
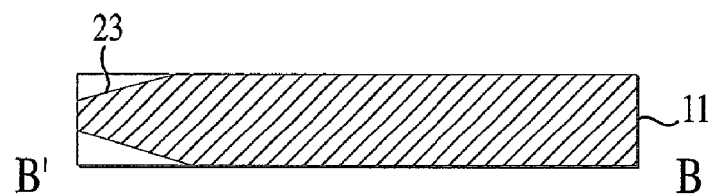
FIG. 5(c) is a diagrammatic sectional view taken along the one-dot chain line B–B' in FIG. 5(a).

Next, a head arm according to a fourth embodiment of the invention will be explained with reference to FIGS. 5(a), 5(b) and 5(c). In this fourth embodiment, chamfered portions are formed instead of the punched protrusions.

As in the prior art, the suspension 12 for supporting the magnetic head is mounted at the forward end of the head arm 11. The head arm 11 further includes a rotary shaft 14.

The head arm according to the fourth embodiment includes chamfered portions 23, which are each about 1 mm wide and have the angled or biting length of 1 mm, for example, and are formed at regular intervals on the downstream side of the head arm 11. In the drawing, six chamfered portions 23 are shown.

Also in this fourth embodiment, the irregularity formed at the downstream end portion develops a similar situation to that of the second embodiment described above, and therefore should have the effect of suppressing the turbulence of the flow in the same manner as in the second embodiment.

Figure 6:
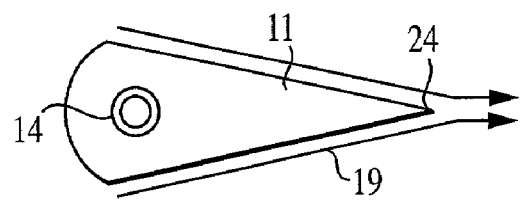
FIG. 6 is a plan view schematically showing a head arm according to a fifth embodiment of the invention.

Next, a head arm according to a fifth embodiment of the invention will be explained with reference to FIG. 6. FIG. 6 is a plan view schematically showing a head arm according to the fifth embodiment, and the head arm 11 includes the rotary shaft 14 as in the prior art.

Though not shown, the suspension 12 for supporting the magnetic head is mounted at the forward end portion as in the prior art. In the head arm according to the fifth embodiment, the forward end portion 24 of the head arm 11 is formed in the shape of a wedge.

By forming a wedge-shaped forward end portion 24 in this way, the air flow 19 cannot be easily separated at the forward end portion, and the air eddy generation is also suppressed, thereby making it possible to reduce the force for vibrating the head arm 11.

Figure 7A:
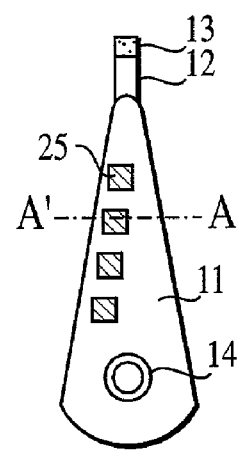
FIG. 7(a) is a plan view schematically showing a head arm according to a sixth embodiment of the invention.

FIG. 7(a) is a plan view schematically showing a head arm according to the sixth embodiment of the invention. The suspension 12 for supporting the magnetic head 13 is mounted at the forward end of the head arm 11 as in the prior art. Further, the head arm 11 is secured to a rotary shaft 14. The head arm according to the sixth embodiment is provided with a plurality of protrusions 25 of plastic 1 mm long, 1 mm wide and 0.2 mm thick, for example, on the upper and lower surfaces of the head arm 11. Four protrusions 25 are shown in the drawing.

Figure 7B:
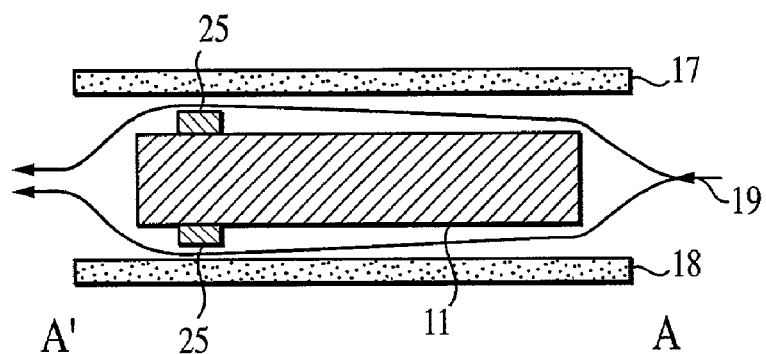
FIG. 7(b) is a diagrammatic sectional view taken along a one-dot chain line A–A' in FIG. 7(a).

FIG. 7(b) shows two magnetic disks 17, 18 between which the head arm is interposed. By forming the protrusions 25 on the head arm 11, an air eddy rotating about an axis perpendicular to the main surfaces of the head arm 11 is generated, and reduces and destroys the existing air eddy, thereby reducing the turbulence of the air flow 19.

Next, with reference to FIGS. 8(a), 8(b) and 8(c), a seventh embodiment of the invention relating to modifications of the first embodiment of the invention will be explained.

Figure 8A:
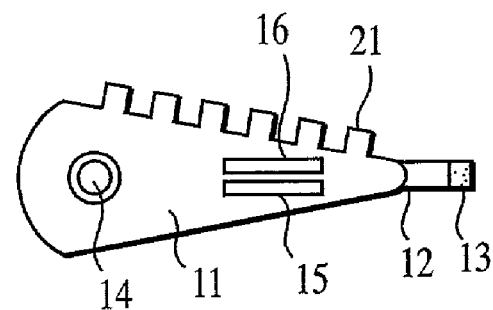
FIG. 8(a) is a plan view of the first embodiment and the second embodiment combined with each other.

In FIG. 8(a), the first embodiment and the second embodiment are combined with each other. The head arm 11 includes two narrow weight-reducing apertures 15, 16, and a plurality of protrusions 21 are formed at regular intervals on the downstream side of the head arm 11. This configuration can suppress the generation of an air eddy due to the weight-reducing apertures, while at the same time suppressing the generation of a downstream air eddy due to the rectangular sectional shape, thereby further reducing the force vibrating the head arm 11.

Figure 8B:
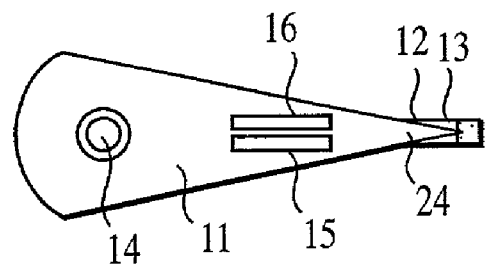
FIG. 8(b) is a plan view of a combination of the first embodiment and the fifth embodiment.

FIG. 8(b) shows a combination of the first embodiment and the fifth embodiment. Two narrow weight-reducing apertures 15, 16 are formed on the head arm 11, and the forward end portion 24 of the head arm 11 is formed in the shape of a wedge. This configuration can suppress the generation of an air eddy due to the weight-reducing apertures, while at the same time suppressing the separation of the air flow or the generation of an air eddy at the forward end portion, thereby further reducing the force vibrating the head arm 11.

Figure 8C:
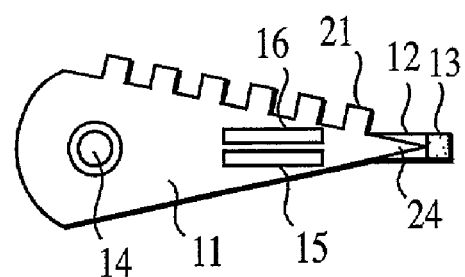
FIG. 8(c) is a plan view of a combination of the first embodiment, the second embodiment and the fifth embodiment.

FIG. 8(c) shows a combination of the first embodiment, the second embodiment and the fifth embodiment. Two narrow weight-reducing apertures 15, 16 are formed on the head arm 11, and the forward end portion 24 of the head arm 11 is formed in the shape of a wedge. Further, a plurality of protrusions 21 are formed at regular intervals at the downstream end portion of the head arm 11. This configuration can suppress both the generation of an air eddy due to the provision of the weight-reducing apertures on the one hand and the separation of the air flow or the generation of an air eddy at the forward end portion on the other. Further, the generation of a downstream air eddy due to the rectangular sectional shape can also be suppressed. Thus, the force for vibrating the head arm 1 can be further reduced.

Figure 9A:
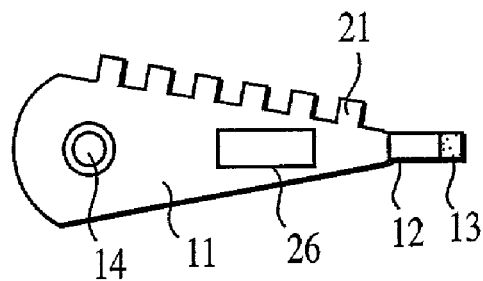
FIG. 9(a) is a plan view of a head arm having a known weight-reducing aperture formed in the second embodiment of the invention.
Figure 9B:
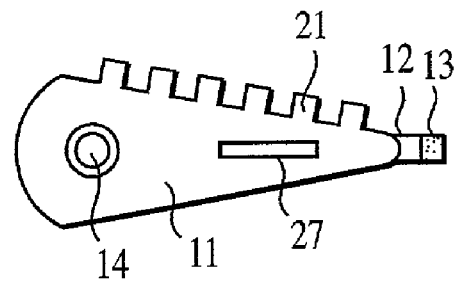
FIG. 9(b) is a plan view of a head arm having a single narrow weight-reducing aperture formed in the head arm in place of the weight-reducing aperture of FIG. 9(a).
Figure 9C:
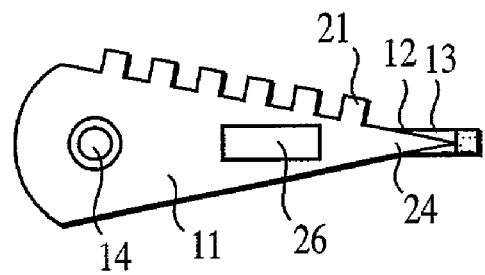
FIG. 9(c) is a plan view of a combination of the configuration of FIG. 9(a) and the fifth embodiment of the invention.

Next, with reference to FIGS. 9(a), 9(b) and 9(c), an eighth embodiment relating to a modification of the second embodiment of the invention will be explained. In FIG. 9(a), a weight-reducing aperture as large as that in the prior art is formed in the second embodiment of the invention described above. The wide weight-reducing aperture 26 is formed in the head arm 11, while at the same time forming a plurality of protrusions 21 at regular intervals at the downstream end portion of the head arm 11. This configuration can reduce the weight as in the prior art and therefore suppress the moment of inertia around the rotary shaft 14 at a low level. At the same time, the generation of an air eddy due to the fact that the sectional shape is a rectangle can be suppressed, thereby making it possible to reduce the force for vibrating the head arm 11.

In FIG. 9(*b*), a single narrow weight-reducing aperture 27 is formed in the head arm 11 in place of the weight-reducing aperture of FIG. 9(*a*), and a plurality of protrusions 21 are formed at regular intervals at the downstream end portion of the head arm 11. This configuration can suppress the generation of an air eddy due to the provision of the apertures, though at the sacrifice of some weight increase. Thus, this configuration should produce an effect intermediate the second embodiment and the configuration shown in FIG. 8(*a*).

FIG. 9(*c*) shows a combination of the configuration of FIG. 9(*a*) and the fifth embodiment. A wide weight-reducing aperture 26 is formed in the head arm 11, while at the same time forming a wedge-shaped forward end portion 24 at the forward end portion of the head arm 11. Further, a plurality of protrusions 21 are formed at regular intervals at the downstream end portion of the head arm 11. This configuration can reduce the weight as in the prior art and therefore suppress the moment of inertia at a low level around the rotary shaft 14, while at the same time suppressing the separation of the air flow or the generation of an air eddy at the forward end portion. Further, the generation of a downstream air eddy due to the rectangular sectional shape can be suppressed, thereby making it possible to reduce the force for vibrating the head arm 11.

Figure 10A:
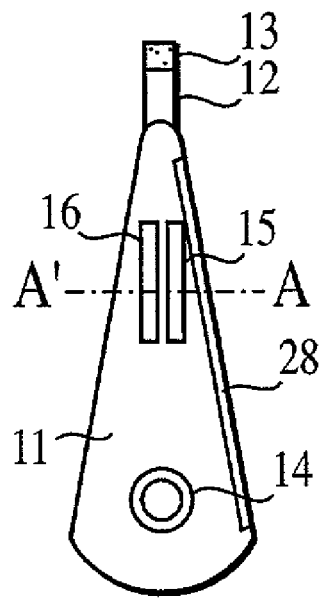
FIG. 10(a) is a plan view schematically showing a head arm according to a ninth embodiment of the invention.
Figure 10B:
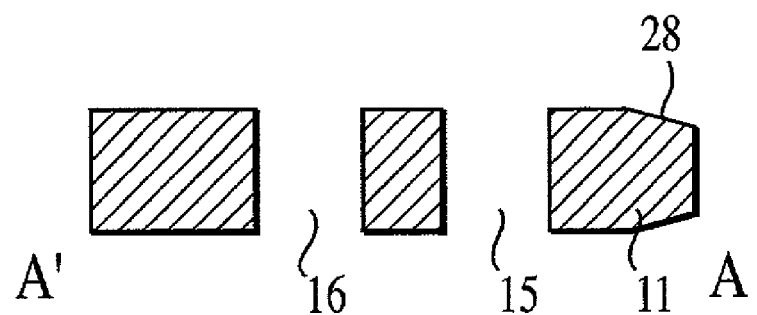
FIG. 10(b) is a diagrammatic sectional view taken along a one-dot chain line A–A' in FIG. 10(a).
Figure 11:
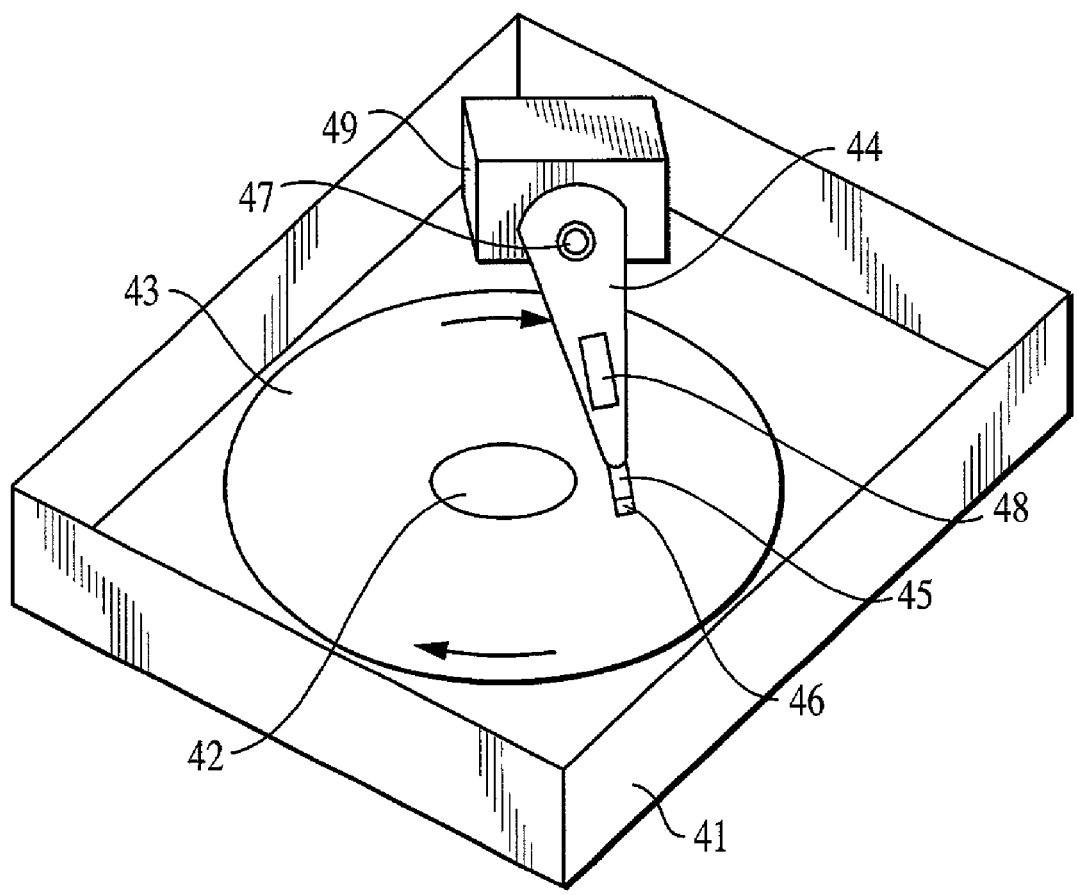
FIG. 11 is a perspective view schematically showing a conventional magnetic disk device.
Figure 12A:
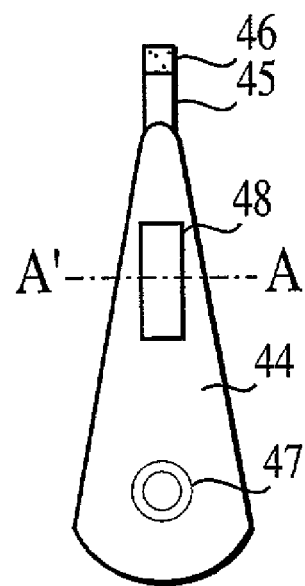
FIG. 12(a) is a plan view schematically showing the conventional head arm of FIG. 11.
Figure 12B:
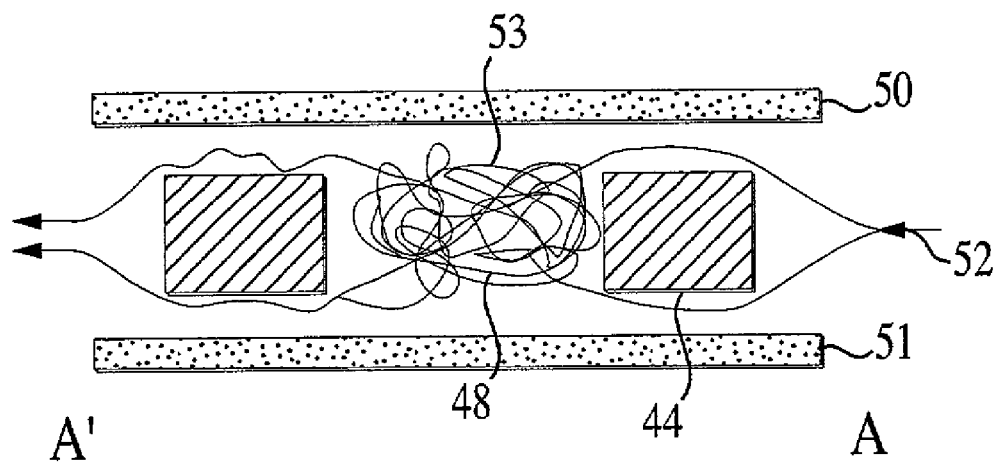
FIG. 12(b) is a sectional view taken along a one-dot chain line A–A' in FIG. 12(a).
Figure 13A:
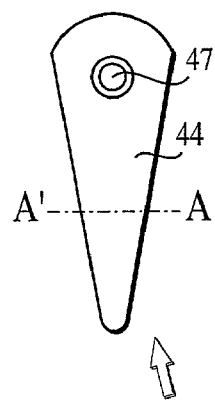
FIG. 13(a) is a plan view schematically showing another conventional head arm.
Figure 13B:
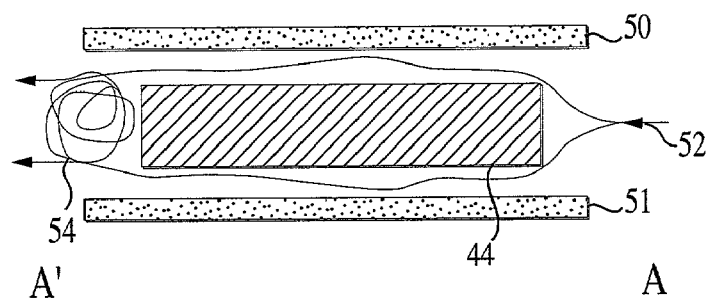
FIG. 13(b) is a sectional view taken along a one-dot chain line A'–A in FIG. 13(a).
Figure 13C:
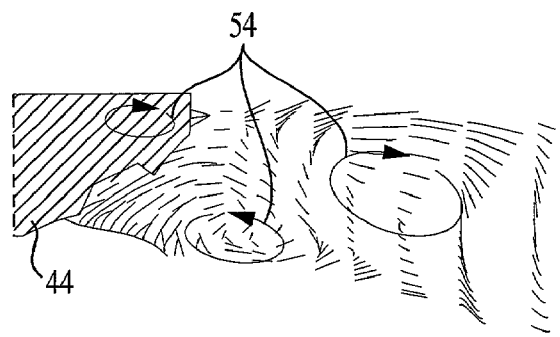
FIG. 13(c) is a diagram showing simulated air flow near the down stream end of the head arm as viewed along the direction of the arrow in FIG. 13(a).
Figure 14:
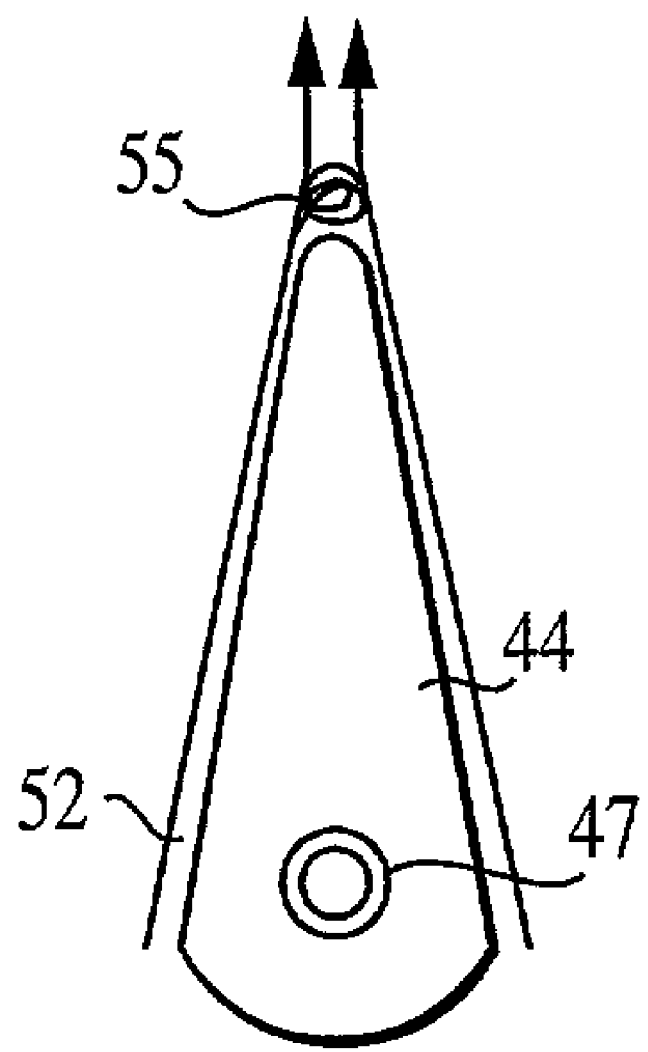
FIG. 14 is a plan view of yet another conventional head arm.

Next, with reference to FIGS. 10(*a*) and 10(*b*), a ninth embodiment relating to a modification shared by all the embodiments described above will be explained. In the case under consideration, a modification of the first embodiment will be explained. A chamfered portion 28 is formed at the upstream end portion of the head arm 11, the remaining configuration being similar to the corresponding one of the first embodiment described above. The provision of the chamfered portion 28 on the upstream side as described above smoothes the air flow more, and therefore can suppress the generation of a turbulent flow. The embodiments of the invention have been described above. Nevertheless, the present invention is not limited to the embodiments described above, but is variously modifiable. For instance, the seventh and eighth embodiments represent only an example of a modification. Basically, any of the configurations according to the first to sixth embodiments can be combined. With regard to the configuration on the downstream side of the head arm, the configuration according to the third embodiment, the fourth embodiment or the sixth embodiment can be employed in place of the aforementioned configuration according to the second embodiment. Also, in the sixth embodiment described above, the protrusions 25, though formed on the upper and lower main surfaces of the head arm 11, can alternatively be formed on only one of the main surfaces.

Further, the dimensions and the number of protrusions according to the second embodiment, the protrusions according to the third embodiment, the chamfered portions according to the fourth embodiment and the protrusions according to the sixth embodiment are not of course limited to those specified in the respective embodiments, but can be changed appropriately in accordance with the shape and weight of the head arm involved. Also, although the embodiments described above fail to refer to the material of the head arm, aluminum is used normally. Nevertheless, other metal such as stainless steel or other materials can be used.

As explained above, according to this invention, a plurality of narrow weight-reducing apertures are formed for reducing the weight of the head arm, and therefore the generation of an air eddy which otherwise might be caused by a single weight-reducing aperture can be suppressed, whereby the force for vibrating the head arm can be suppressed. Thus, the positioning accuracy of the magnetic head can be improved, thereby greatly contributing to a higher speed and a higher performance of the magnetic disk device.

Also, according to this invention, the irregularity or the protrusions are formed at the downstream end portion or on the main surfaces of the head arm, and therefore, the existing air eddy can be reduced or destroyed by the air eddy generated by the irregularity or the protrusions, as the case may be, thereby suppressing the force for vibrating the head arm. Thus, the positioning accuracy of the magnetic head can be improved, thereby greatly contributing to a higher speed and a higher performance of the magnetic disk device.

Further, according to this invention, the forward end portion of the head arm can be formed in the shape of a wedge. Therefore, the air flow cannot be easily separated along the end portion of the head arm and the generation of an air eddy can be suppressed. As a result, the force for vibrating the head arm can be suppressed. Thus, the positioning accuracy of the magnetic head can be improved, thereby greatly contributing to a higher speed and a higher performance of the magnetic disk device.

While the principles of the invention have been described above in connection with specific apparatus and applications, it is to be understood that this description is made only by way of example and not as a limitation on the scope of the invention.

What is claimed is:

1. A head arm of a magnetic disk device with a magnetic head mounted on a bottom surface of a forward end thereof and secured to an actuator at a rear end thereof, comprising:
   an upper surface opposite the bottom surface extending between a leading edge of an upstream portion and a trailing edge of a downstream portion, the leading edge and the trailing edge being in a same plane;
   a plurality of apertures formed in said head arm;
   wherein the apertures are adjacent each other in a direction substantially transverse to a direction extending between the forward end and the rear end, so as to suppress air eddy currents generated at the head arm when at least one disk in the magnetic disk device rotates.

2. The head arm of claim 1, wherein vibration of the head arm is reduced by the suppression of the air eddy currents.

3. The head arm of claim 2, wherein a downstream portion of the head arm is formed with a plurality of irregularities at regular or irregular intervals.

4. The head arm of claim 1, wherein a downstream portion of the head arm is formed with a plurality of irregularities at regular or irregular intervals.

5. The head arm of claim 1, wherein turbulence energy is reduced by about 10% compared with the turbulence energy generated with only conventional apertures.

6. The head arm of claim 1, comprising at least three or more apertures.

7. The head arm of claim 1, wherein the head arm is made of metal, and the apertures are formed by punching.

8. The head arm of claim 1, wherein the head arm is made of metal, a single aperture is punched in the metal, and the aperture is divided by bonding plastic bridging material across the aperture to create the plurality of apertures.

9. The head arm of claim 1, wherein the apertures are dimensioned such that the air eddy currents are not substantially generated in the apertures and the airflow is not substantially disturbed by the apertures.

10. The head arm of claim 1, comprising a plurality of protrusions formed at regular intervals on a downstream side of the head arm.

11. The head arm of claim 10, comprising six of the protrusions.

12. The head arm of claim 1, wherein the protrusions are formed by punching.

13. The head arm of claim 1, wherein the protrusions are formed separately from the head arm and are attached to the head arm.

14. The head arm of claim 1, wherein the forward end of the head arm is formed in the shape of a wedge.

15. The head arm of claim 1, wherein the apertures are aligned substantially parallel to each other in a direction extending between the forward end and the rear end.

16. A head arm of a magnetic disk device with a magnetic head mounted on a bottom surface of a forward end thereof and secured to an actuator at a rear end thereof, comprising:
    an upstream portion relative to an airflow generated by at least one disk in the disk device, said upstream portion extending from the rear end to the forward end;
    a downstream portion opposite said upstream portion;
    an upper surface opposite the bottom surface extending between a leading edge of said upstream portion and a trailing edge of said downstream portion, the leading edge and the trailing edge being in a same plane;
    at least one irregularity formed proximate said downstream portion of the head arm for suppressing air eddy currents generated at said head arm when the at least one disk in the magnetic disk device rotates.

17. The head arm of claim 16, wherein the irregularity includes a plurality of protrusions spaced at regular intervals along the downstream portion of the head arm.

18. The head arm of claim 17, wherein the head arm is made of metal and the protrusions are formed by punching.

19. The head arm of claim 17, wherein the protrusions are made separately from the head arm and are attached to the head arm.

20. The head arm of claim 16, comprising at least one weight reducing aperture.

21. The head arm of claim 20, wherein the forward end portion of the head arm is formed in the shape of a wedge.

22. A head arm of a magnetic disk device having at least one disk, comprising;
    a rear end portion configured to be secured to a rotary shaft of an actuator;
    a forward end portion opposite said rear end portion configured to have a magnetic head mounted thereon;
    an upstream side relative to an airflow generated by the disk when the disk is rotated; and
    a downstream side opposite said upstream side;
    wherein said downstream side and said upstream side connect to form a point defining an angle between said downstream side and said upstream side at said forward end portion.

23. A head arm of a magnetic disk device with a magnetic head mounted at the forward end thereof and driven by an actuator at the other end thereof, the magnetic disk device having at least one disk, said head arm comprising:
    leading edge relative to an airflow generated by the disk when the disk is rotated;
    trailing edge opposite said upstream side;
    an upper surface and a lower surface extending between said upstream edge and said downstream edge the leading edge and the trailing edge being in a same plane; and
    at least one protrusion extending from the upper or lower surface of the head arm for suppressing air eddy currents generated at said head arm when the at least one disk in the magnetic disk device rotates.

24. The head arm of claim 23, comprising a plurality of protrusions on the upper and lower surfaces of the head arm.

25. The head arm of claim 24, wherein said forward end portion of said head arm is formed in the shape of a wedge.

* * * * *

UNITED STATES PATENT AND TRADEMARK OFFICE
CERTIFICATE OF CORRECTION

PATENT NO. : 7,130,158 B2
APPLICATION NO. : 10/157028
DATED : October 31, 2006
INVENTOR(S) : Hiroyuki Kubotera Page 1 of 1

It is certified that error appears in the above-identified patent and that said Letters Patent is hereby corrected as shown below:

Col. 10, line 37, delete "claim 24" and insert --claim 22--.

Signed and Sealed this

Tenth Day of April, 2007

JON W. DUDAS
*Director of the United States Patent and Trademark Office*